United States Patent [19]
Sandberg et al.

[11] 3,990,891
[45] Nov. 9, 1976

[54] HALIDATION OF NONFERROUS METAL VALUES IN MANGANESE OXIDE ORES

[75] Inventors: Richard G. Sandberg, Gloucester; Paul H. Cardwell, Zanoni, both of Va.

[73] Assignee: Deepsea Ventures, Inc., Gloucester Point, Va.

[22] Filed: May 24, 1974

[21] Appl. No.: 472,974

[52] U.S. Cl. .................................. 75/80; 423/35; 423/46; 423/51; 423/140; 423/150; 423/492; 423/495; 423/341

[51] Int. Cl.² .................... C22B 47/00; C01G 3/04; C01G 51/08; C01G 53/08

[58] Field of Search ................. 423/49, 51, 149, 46, 423/491, 492, 35, 495, 150; 75/80, 111, 68 R, 68 B, 121, 113

[56] References Cited
UNITED STATES PATENTS

| | | | |
|---|---|---|---|
| 1,571,502 | 2/1926 | Venn-Brown | 75/113 |
| 1,937,661 | 12/1933 | Meyer | 423/46 |
| 2,176,776 | 10/1939 | Sweet et al. | 75/111 |
| 2,594,370 | 4/1952 | Warburton | 423/149 X |
| 2,733,983 | 2/1956 | Daubenspeck | 423/149 |
| 2,777,755 | 1/1957 | Eberhardt | 423/49 |
| 3,466,169 | 9/1969 | Nowak et al. | 75/113 X |
| 3,950,162 | 4/1976 | Schobert et al. | 75/80 |

Primary Examiner—Oscar R. Vertiz
Assistant Examiner—Brian E. Hearn
Attorney, Agent, or Firm—Barry G. Magidoff

[57] ABSTRACT

This invention provides a process for obtaining the nonferrous metal values from a manganese oxide ore, by reacting the ore with an aluminum halide or a ferric halide at a temperature of at least about 50° C and preferably, at least about 130° C. The manganese oxide ore can be treated with or without reduction. If reduction of the manganese oxide ore is desired, it can be accomplished prior to, or simultaneously with, the reaction with the aluminum halide or ferric halide.

The resulting nonferrous metal halides can be separated from the reacted ore residue by conventional methods such as leaching or evaporation.

21 Claims, No Drawings

HALIDATION OF NONFERROUS METAL VALUES IN MANGANESE OXIDE ORES

It is desirable to obtain the halides of the various nonferrous metals present in manganese oxide ores so as to separate these nonferrous metal values from the undesirable elements in the ore, including the portion known as the detritus, as well as in many cases, the iron value in the ore. In order to reach this desired result, one step that has been followed has been the halidation of the ore so as to convert the desired nonferrous metal values into the halides, from the oxides, and then separating out these halides, for example, by solution in water or evaporation.

For example, plants have been constructed wherein various metal ores have been chloridated utilizing a sodium chloride or calcium chloride. A pyrites ore, for example, is initially roasted to remove sulfur content and this roasted ore is then reacted with the sodium chloride or calcium chloride at elevated temperatures to form inter alia a chloride, silver chloride, bismuth chloride and zinc chloride. See, for example, Chemical Engineering, Apr. 8, 1968, pages 114–116, "Japanese Process Makes Blast Furnace Feed From Pyrites Concentrate." In this case, the nonferrous metal values are removed from the pyrites ore so as to enable the remaining ore to be used as a raw material in iron production. The nonferrous metals which are removed thus become a valuable byproduct of that process. The chlorides are separated from the remaining cinder by leaching or by violatilizing the nonferrous chlorides, followed by condensing and collecting them after separation from the cinder.

Various manganiferous ores have also been reacted, wherein the manganese is in its lowest valence state, i.e. as MnO, and generally wherein the other metal values which are present are also not in their highest valence state. When reacting such manganiferous ores with sodium or calcium chlorides, the reactions are carried out at temperatures sufficiently high to vaporize the halides which are formed and, in general, both iron and manganese chlorides are formed. Generally, temperatures above about 1100° C are utilized and required. The chloride vapors are swept from the furnace with a stream of an inert gas, such as dry nitrogen, and the chloride vapors are then generally condensed as a dry product. The mixed chlorides can then be dissolved in water, and, by varying the pH of the solution, separated by sequential precipitation. See, for example, *Review of Major Proposed Processes for Recovering Manganese from U.S. Resources*, Information Circular 8160, U.S. Department of Interior, Bureau of Mines, "2. Chloride and Fixed Nitrogen Processes," by Norman et al.

It has also been previously suggested to react certain manganese oxide ores in a molten bath of alkali metal and/or alkaline earth metal halides so as to obtain the halides of the nonferrous metals in the manganiferous ore.

Nickeliferous ores, containing various proportions of nickel and cobalt,, have also been chloridated, utilizing a metal chloride as a chloride source. In one process, the ore is initially oxidized and then selectively chloridated so that nickel and cobalt chlorides are volatilized and separated from the gangue fraction of the ore. For example, Daubenspeck, U.S. Pat. No. 2,733,983, suggests the use of ferric chloride as the chloridizing agent for chloridating a dehydrated oxidized ore. It is asserted that this reaction is particularly effective in that ferric oxides present in the ore remain substantially unreacted; this presumably results in greater efficiency for the process. It is suggested to carry out the chloridation step at a temperature in the range of from about 600° C to about 700° C, so as to ensure the chloridation of nickel and cobalt and avoid the chloridation of the gangue fraction, including the iron.

Molten manganese halide has been reduced by molten aluminum to form the molten pure manganese metal and vaporous aluminum halides.

The present invention provides a process for obtaining the nonferrous metal values from a manganese oxide ore which can be carried out at relatively low temperatures. The nonferrous metal values being obtained as the water-soluble halides, without converting the iron value to the halides, thus resulting in a simple method for separating the desired nonferrous metal values from the iron value. The process of the present invention is especially adapted for the treating of an ore comprising as its primary metal values manganese and iron and also comprising, in secondary quantities, one or more of nickel, cobalt, and copper.

In accordance with the present invention, there is provided a process for obtaining the nonferrous metal values, as the halides, from a manganese oxide ore, the process comprising reacting, at a temperature of at least about 50° C, the manganese oxide ore with a halidation reagent selected from the group consisting of ferric halide and aluminum halide, to form a nonferrous metal halide reaction product comprising manganous halide.

The term "manganese oxide" refers to any manganese oxide compound or to a compound of manganese which is converted to the oxide at higher temperatures, such as the manganese carbonates. Generally, manganese is the most prevalent metal and iron is the second most prevalent metal in the ore; the other metals are present in secondary quantities, i.e. quantities less than that at which iron is present, and generally in proportions not greater than about, for example, 50% by weight of the iron present in the ore, measured as the metal value.

The halidation procedure of the present invention is preferably carried out at a temperature of at least about 130° C. Further, temperatures of above about 800° C are not required, or desirable, because of the generally great expense and difficulty of operating processes at such elevated temperatures. Most preferably, in fact, the procedure is carried out at temperatures not greater than about 200° C.

The nonferrous metal halide reaction products generally comprise in addition to manganous halide the other metal values present in the ore, such as the halides of nickel, copper, and cobalt. The term "halide", when used in the present process, is defined as including only chlorides, bromides and iodides, and preferably only the chlorides, of the listed metals. These halide reaction products can be readily separated from the substantially insoluble and involatile gangue, especially the iron oxides, and oxide reaction product, by evaporation or by leaching with water so as to obtain an aqueous solution of the water-soluble nonferrous metal halide reaction products. In order for evaporation to be a practical method of separation, of course, the reaction products should be heated to elevated temperatures, generally to temperatures of at least about 400° C in order to obtain a sufficient evaporation rate of the nonferrous metal halides to render economical the evaporation process.

The temperature of the reaction determines the preferred physical state of the regent and of the products formed during the course of the halidation reaction. Generally, this process can be carried out with the reagents and reaction products being in substantially any physical state. At optimum lower temperatures, i.e. of from about 50° to about 160° C, the reagent metal halides can be admixed, preferably as fine particles, with a similarly finely comminuted solid ore. Such a reaction is carried out, for example, in a rotary kiln, or in a heated ball mill. A process in which it is desired that the reagents and products all be in the solid state, should be carried out at temperatures below those at which there is a substantial vapor pressure of the reagent metal halide. Thus, for example, when utilizing solid, e.g. aluminum chloride, which sublimes, at atmospheric pressure, at 178° C, the temperatures are most desirably at, or below, about 150° C.

At higher temperatures, i.e. above the boiling point of the reagent metal halide, e.g. $AlCl_3$ sublimes at 178° C at atmospheric pressure, the ore can be contacted with the reagent metal vapor, for example in a fluidized bed reactor, or by passing the vapor upwardly through a stationery bed. The fluidized bed or a moving bed is preferred, because of the greater reactivity of finely comminuted particles and the difficulty of passing vapor upwardly through a stationery bed of such fine particles.

The reaction can also be carried out in the molten or liquid state in, for example, a molten salt bath. The bath can initially contain the halides of any of the nonferrous metals in the ore to be treated and/or inert halides, such as alkali or alkaline earth metal halides. In carrying out this procedure, the preferably finely divided particulate ore is dispersed into the molten salt bath within which it is contacted with the reactant metal halide. Generally, the reactant metal halide will be in the form of a vapor which can be introduced below the surface, preferably at the bottom, of the molten salt bath, through which it will rise and react with any of the ore which may be present. In order to operate within the desired temperature ranges, generally a eutectic mixture of various halides must be utilized as the salt bath in order to obtain a melt within the desired range. In carrying out this reaction in the molten state, there should be sufficient molten salt bath present so that when it is admixed with the finely comminuted ore, a fluid mixture is obtained.

Subsequent to completion of the halidation reaction in the molten phase, the desired metal halides that are formed from the metal values in the ore, especially nickel, cobalt, copper, and manganese halides, are separated from the molten reaction mass. The separation can be accomplished, for example, by vaporization of the desired nonferrous metal halides at elevated temperatures. Alternatively, the nonferrous metal halide products can be leached out from the mixture containing the reacted nodule ore by contacting the entire cooled, reacted nodule ore with water in order to dissolve out the desired metal halides, together with any alkali metal and alkaline earth metal halides present.

When leaching out the desired metal halide products from the reacted ore mixture, the reacted ore is cooled, preferably to a temperature of not greater than about 100° C. The particulate cooled product is then contacted with water, preferably having a pH not greater than about 3.0 and, most preferably, not above about 2.5, and optimally in the range of from about 1.5 to about 2.5. Such an aqueous leaching solution, or water, can be utilized for the leaching of the desired metal halide product from the reacted ore, regardless of the method by which the ore is halidated. However, when the reaction is carried out in a molten bath, generally, the leach solution will contain in addition to the reaction products of the reacted ore, at least a portion of the metal halides forming the molten salt bath. Also the same solution can be used to dissolve condensed evaporated metal halides.

It is sometimes useful, prior to halidation, to grind and crush the manganese oxide ore so as to reduce the particle size to not greater than about 10 mesh, so as to increase the speed of the reaction and to ensure a more complete reaction of the ore. The ore can be dehydrated by being maintained at a temperature of at least about 100° C and preferably at a temperature in the range of from about 130° C to about 450° C, and optimally at least at about 150° C to about 350° C.

Many manganese oxide ores contain manganese in a higher valence state, e.g. manganese in the +4 valence state, as in $MnO_2$, or in the +3 valence state, as in $Mn_2O_3$. The reaction of such higher oxides of manganese with the reactive metal halides results in the formation of halogen as a byproduct in accordance with the following equation: (Note that in the following equation the reagent metal halide is exemplified by aluminum chloride ($AlCl_3$).)

$$4AlCl_3 + 3MnO_2 \rightarrow 2Al_2O_3 + 3MnCl_2 + 3Cl_2$$

$$2AlCl_3 + Mn_2O_3 \rightarrow Al_2O_3 + 2MnCl_2 + Cl_2$$

When the manganese value is in its lowest combined valence state, i.e. +2, as MnO, the reaction occurs as follows:

$$2AlCl_3 + 3MnO \rightarrow Al_2O_3 + 3MnCl_2$$

As shown from the above, the reaction with the higher valence manganese compounds requires a substantially greater amount of the reactant metal halide, e.g. $AlCl_3$, in order to obtain a given amount of the manganese halide. For example, with the $MnO_2$, 4 mols of the aluminum chloride are required to gain 3 mols of manganese chloride, whereas for the MnO, only two mols of the aluminum chloride are required to gain 3 mols of the manganese chloride. Accordingly, in order to conserve on the reactant metal halide required for the process in accordance with the present invention, it is preferable to preliminarily reduce the manganese ore so as to convert the manganese value to its lowest combined valence state. This can be most easily and economically done by reacting the manganese ore with a carbonaceous reducing agent which will itself be converted to carbon dioxide while the manganese oxide is reduced to MnO. Generally, however, any reducing agent having sufficient reducing strength to reduce tetravalent manganese or trivalent manganese to the divalent manganese can be utilized. However, the reaction of the reducing agent with the ore should not result in the formation of any compounds of the desired metal values which are not readily converted to halides in accordance with the present process. For example, elemental carbon in any physical state, including amorphous or graphitic carbon, or natural or semimanufactured carbonaceous material such as coal, peat, charcoal and coke can be used. Oil or other organic sources can be utilized as a source for the reducing action of carbon. Any hydrocarbon can be used: aromatic, aliphatic or cycloaliphatic, or compounds having combinations of these groups, without interfering with the reducing action. The higher condensed ring aromatic materials, including especially those derived from petroleum or other natural mineral products and which are often available as byproduct tars from the refining of these materials, have the highest proportion of carbon among the hydrocarbons, and, therefore, provide the greatest unit weight effectiveness as the reducing medium. Gaseous materials, such as carbon monoxide, alone or admixed with hydrogen, as in reformer gas, can also be readily utilized as the reducing agent. Hydrogen itself, if available cheaply enough, can also be utilized.

It has been found that the most efficient temperature for the reduction reaction is, of course, dependent upon the reducing agent used. Generally, the stronger reducing agents, i.e. those agents which are most effective in reducing tetravalent manganese to the divalent state, and which also can reduce the other metal values present, can be utilized at temperatures as low as about 400° C to obtain effective reduction of the manganese to the divalent state. Examples of such relatively strong reducing agents are elemental carbon, or hydrogen, or carbon monoxide. Other reducing agents, such as, for example, the hydrocarbons, which are somewhat less effective in reducing manganese and any of the other metal values, should be used at higher temperatures of at least about 500° C. Generally, the higher the temperature, the faster the rate of reduction reaction. In any event, generally, a temperature greater than about 750° C is not used, and preferably temperatures in the range of from about 450° C to about 700° C, and optimally not greater than about 600° C should be utilized for the reduction step.

Alternatively, the reducing reaction can be carried out substantially simultaneously with the halidation as a single-step process, by admixing the manganese oxide ore with the reducing agent and the reagent metal halide in a single reactor vessel, preferably when the reaction is carried out in the molten state.

The halidation, in accordance with the present invention, results in the halidation not only of the manganese values in the manganese oxide ores, but of various other metals which may also be present in the ores, in accordance, for example, with the following reaction equations:

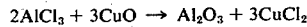

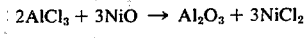

Although the process in accordance with the present reaction can be carried out with any type of manganese ore, regardless of its characteristics and composition, this process is especially useful for the unique type of ore, known as the ocean floor nodule ore. Such nodules are formed as an extremely complex crystal matrix of iron and manganese oxides: tiny grains of each oxide of a size and type which are substantially impossible to separate with presently available physical means. These iron and manganese oxides form the crystal structure within which are held, by means not precisely known, other metal compounds, most likely oxides, including those of nickel, copper and cobalt. There is also a large quantity of silt, or gangue, material intimately admixed in the nodule ore. The silt, or gangue, is sand and clay, and includes the oxides of silicon and aluminum in varying proportions. The precise chemical composition of these nodule ores varies with their location on the ocean floor. However, generally, the more valuable ores comprise primary quantities of manganese and iron generally in a ratio by weight of manganese-to-iron of at least about 5-to-1.

After the halides of the metal values of the manganese oxide ore are separated from the reacted ore mass, they are preferably then further separated into their individual components. Generally, this can best be carried out, especially for the complex combination of metals obtained from the ocean floor nodule ores, by hydrometallurgical refining methods. After separation of a halide of one metal to form a substantially pure metal halide, the pure metal halide can then be reduced to form an elemental metal. For example, when it is desired to obtain manganese as a metal product, this procedure is especially valuable in that manganese halide can be reduced to the elemental metal by reaction with aluminum metal to form, as a byproduct, aluminum halide.

A second, and preferred, procedure for reducing manganese halide comprises reacting the crystalline manganese halide with a tranportable sub-halide of a transport metal selected from aluminum, titanium and silicon to form metallic manganese and a normal halide of the transport metal. The preferred transport metal is aluminum. Such transportable subhalides are described, for example, in the text *Chemical Transport Reactions*, by Harold Schafer, Academic Press (1964). This reaction is preferably carried out at a temperature in the range of from about 600° to about 800° C and most preferably about 650° to about 750° C. The metallic manganese is formed as an alloy with the transport metal and the transport metal normal halide is removed as a vapor. The alloy can then be further reacted at a temperature of at least about 1300° C with a portion of the normal transport metal halide to form pure molten manganese metal and the subhalide. Another portion of the preferred aluminum normal halide product can then be used as the reagent for reaction with the ore in accordance with the process of the present invention.

The solution of the halides of the metal values of the manganese oxide ore can be obtained by carrying out the following procedures. The reacted ore mass, or the condensed, evaporated metal halide products, reacted and/or evaporated as explained above, is leached with water, as also explained above, to form an aqueous solution of the mixed metal halides. As explained above, the iron values present in the manganese oxide ore are not reacted and thus there is substantially no iron halide present in this solution. When utilizing iron halide as the reactant metal halide, it is preferred that the ore be present in at least a stoichiometric amount required to fully react with all of the ferric halide, thereby ensuring that there is no ferric halide present in the leached solution. In one preferred aspect of this process, a method for obtaining substantially pure manganous halide is carried out as follows. The leaching solution is contacted with the reacted ore mass, or condensed metal halides, at a temperature of at least about 90° C to form a leach solution which is highly concentrated, and, optimally, substantially saturated, in manganous halide at that temperature. The solution is then separated from any remaining solids, which would include, in the case of the ore mass, the unreacted ore residue and iron oxide. This highly concentrated, hot leach solution is then cooled, preferably to a temperature of at least about 60° C, and the concentration of the manganous halide in the initial hot solution is preferably sufficient so that at least about 20% of the manganous halide present in the solution crystallizes out at the lower temperature. Preferably, however, at least about 50% of the manganese halide in the solution is crystallized out at the temperatures to which the solution is cooled.

Alternatively, where the leaching is carried out at a lower temperature or where the concentration of manganese halide in solution is too low to be crystallized by merely cooling, the solution can be evaporated until the desired amount of manganese crystallizes out.

For a more detailed exposition of this procedure for separating out the individual manganese value from the leach solution, see the description for treating the "iron-free" aqueous solution in South African application, Ser. No. 74/1339 filed on Feb. 28, 1974.

As an alternative to the above procedure, the individual metal halides can be separated from the pregnant leach solution using the "liquid ion exchange procedures" described, for example, in commonly owned, U.S. application Ser. No. 247,693, now U.S. Pat. No. 3,854,851, or those described for the "iron-free" solution in German Offenlegungsschrift No. 2,320,881, published on Nov. 15, 1973, which are incorporated herein by reference.

The following example is an embodiment of the procedures carried out in accordance with the process of the present invention. It is only exemplary of the present invention and does not limit the scope thereof, which encompasses the procedures as broadly defined above and all equivalents thereof.

EXAMPLE I

A sample of an ocean floor nodule ore (a manganese oxide ore which contains 29% by weight manganese and 6% by weight iron, as the primary, metal values, and secondary proportions of copper, cobalt and nickel), having been ground to a particle size of not greater than about 32 mesh, is initially dried at 330° C for two hours. A sample of 200 grams (g) dried ore is mixed with 50 g coal (having a particle size of not greater than 100 mesh). The nodule-coal mixture is placed into a 2.5 inch Vycor tube and then placed into a furnace. The tube and the contents are initially purged with nitrogen at a rate of 150 c c./min., while the furnace is being heated to a temperature of about 500° C. When the operating temperature is reached, the nitrogen purge is closed off and the Vycor tube is maintained in the oven for a period of two hours, during which time it is turned every 10 minutes. One end of the Vycor tube is closed, the other end opens into a water trap which maintains a slight pressure within the Vycor tube.

After two hours, the Vycor tube, and the contents thereof, is removed from the furnace and the tube is again purged with nitrogen until the Vycor tube is cooled to substantially ambient temperature.

The halidation reaction of the ore was carried out in a 0.3 gallon porcelain ball mill jar, fitted with a lid having a tube leading to a vapor exhaust conduit, attached thereto. The jar was placed in a cylindrical electric heater. The ball mill contains 25 1-inch diameter porcelain balls which had been dried in a drying oven at 150° C for one hour and then cooled in a dessicator.

The dried reduced ore, 170 g, and 85 g anhydrous $AlCl_3$ are then added to the ballmill jar, together with the porcelain mixing balls. The lid is sealed onto the jar with a teflon gasket and clamped in place. The jar is then rotated at a rate of about 40 to about 48 r.p.m. and the heaters activated. The jar and its contents reach a temperature of 140° C after about one half-hour rotation and rotation continues for an additional one and one-half hours. After this time, the heaters are turned off and rotation of the jar discontinued. The ballmill jar is then removed and placed into a dessicator, where it is permitted to cool to ambient temperature before being open.

Water at a pH of about 2, is mixed with the cooled ore for about 15 minutes and the solid material removed from the aqueous solution by filtration. The solution was analyzed and 95% of the manganese value, 100% of the copper value, 97% of the nickel value and 97% of the cobalt value present in the original nodule ore were converted to their corresponding chlorides. and dissolved by the aqueous solution.

The patentable embodiments of this invention which are claimed are as follows:

1. A process for obtaining the nonferrous metal values, as the halides, from a manganese oxide ore, the process comprising reacting, at a temperature in the range of from about 50° C to about 160° C, the manganese oxide ore with a halidation reagent selected from the group consisting of aluminum halides to form a nonferrous metal halide reaction product comprising a manganous halide.

2. A process in accordance with claim 1 comprising in addition dehydrating the manganese oxide ore prior to reacting with the halidation reagent.

3. A process for obtaining the nonferrous metal values, as the halides, from a manganese oxide ore, the manganese oxide ore comprising manganese in a valence state higher than divalent, the process comprising:
   reducing and dehydrating the manganese oxide ore so as to reduce the manganese value in the ore to the divalent state and to substantially dehydrate the ore;
   reacting the reduced and dehydrated nodule ore with an aluminum halide halidation reagent at a temperature in the range of from about 50° to about 160° C. so as to form a nonferrous metal halide reaction product comprising a manganous halide.

4. A process in accordance with claim 3, wherein the halides are chlorides.

5. A process in accordance with claim 3 wherein the manganese oxide ore is reduced by being reacted with hydrogen.

6. A process in accordance with claim 3, wherein the manganese oxide ore is reduced by being reacted with a carbonaceous material reducing agent.

7. A process in accordance with claim 6, wherein the manganese oxide ore is an ocean floor nodule ore, and the ore is reduced at a temperature of at least about 500° C.

8. A process in accordance with claim 6, wherein the carbonaceous reducing agent is selected from the group consisting of carbon, hydrocarbon compounds and carbon monoxide.

9. A process in accordance with claim 3 wherein the aluminum halide is aluminum choride.

10. A process in accordance with claim 9, wherein the manganese oxide ore is initially comminuted to a particle size of not greater than about 10 mesh.

11. A process in accordance with claim 9, wherein the manganese oxide ore comprises primary quantities of manganese and iron values.

12. A process in accordance with claim 11, wherein the manganese oxide ore comprises in addition a secondary quantity of at least one other nonferrous metal value, and wherein further the reaction product comprises a mixture of manganous chloride plus the chloride of the other nonferrous metal value.

13. A process for obtaining the nonferrous metal values, as a halide, from an ocean floor nodule ore containing the oxides of manganese and iron as the primary metal values and secondary amounts of copper, cobalt and nickel compounds, the process comprising:
reducing the nodule ore so as to reduce the manganese value in the ore to the divalent state;
reacting the reduced nodule ore with an aluminum halide halidation reagent at a temperature in the range of from about 50° to about 160° C so as to form a reacted ore product comprising the halides of the manganese, nickel, copper and cobalt values.

14. A process in accordance with claim 13, wherein the nodule ore is reduced by reacting the ore with a carbonaceous reducing agent at a temperature of at least about 400° C.

15. A process in accordance with claim 14 wherein the carbonaceous reducing agent is selected from the group consisting of carbon, hydrocarbon compounds and carbon monoxide.

16. A process in accordance with claim 14, wherein the aluminum halide is aluminum chloride.

17. A process in accordance with claim 16, comprising in addition, leaching the reacted ore product with a leaching water solution having a pH of not greater than about 3 so as to form an aqueous solution of the chlorides of manganese, nickel, cobalt and copper and separating the aqueous solution from the remaining insoluble solid materials, including insoluble iron oxide and insoluble aluminum oxide.

18. A process in accordance with claim 17, wherein substantially pure manganous chloride is obtained by crystallization from the aqueous solution.

19. A process in accordance with claim 18, wherein the substantially pure manganous chloride is reduced by reaction with a subhalide of a transport metal selected from the group consisting of silicon, aluminum and titanium to form metallic manganese and a normal halide of the transport metal.

20. A process in accordance with claim 19, wherein the transport metal subhalide is aluminum monochloride and wherein the normal halide is aluminum trichloride and comprising in addition reacting the aluminum trichloride so formed with the ore.

21. A process in accordance with claim 13 wherein the nodule ore is reduced by reacting the ore with hydrogen.

* * * * *